Sept. 5, 1967   A. C. KNIGHT   3,340,126
METHOD OF FORMING A LAMINAR TANK
Filed June 3, 1964
FIG. I
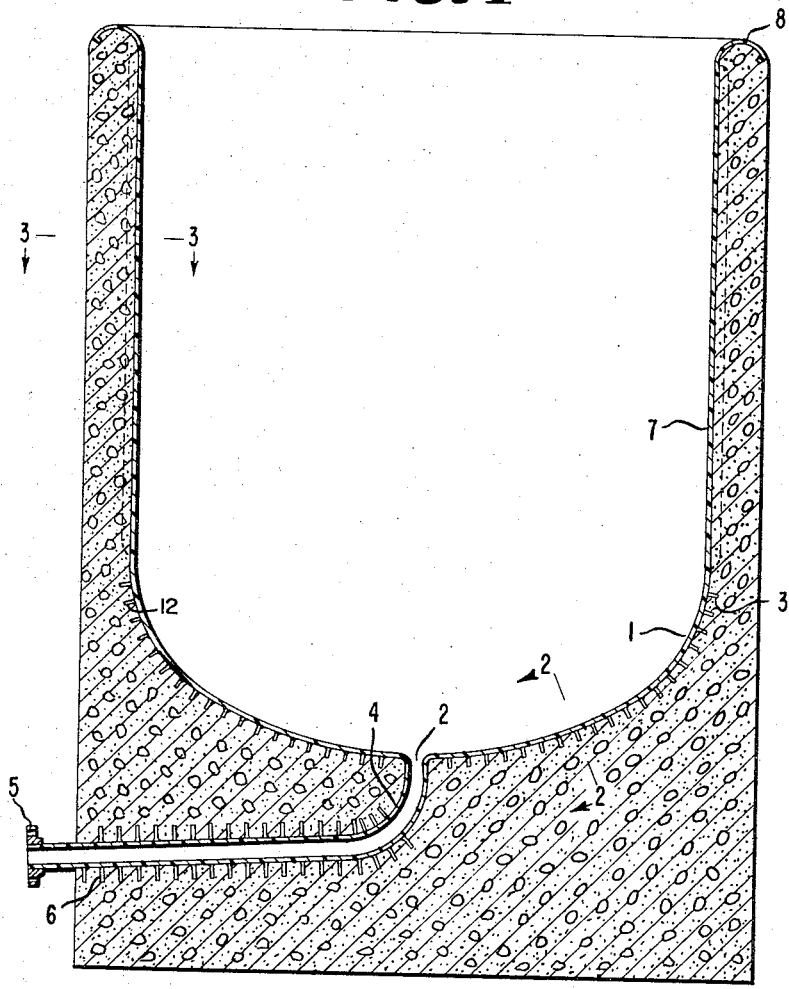
FIG. II
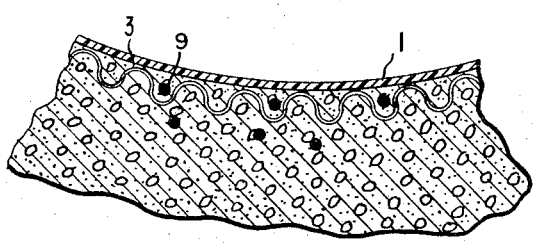
FIG. III
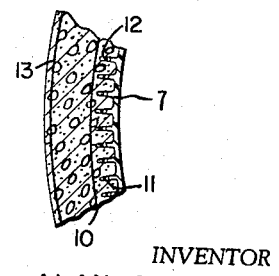
INVENTOR
ALAN C. KNIGHT
Earl L. Handley
ATTORNEY

United States Patent Office 3,340,126
Patented Sept. 5, 1967

3,340,126
METHOD OF FORMING A LAMINAR TANK
Alan C. Knight, Chatham, Wilmington, Del., assignor to E. I. du Pont de Nemours and Company, Wilmington, Del., a corporation of Delaware
Filed June 3, 1964, Ser. No. 372,247
1 Claim. (Cl. 156—281)

This invention relates to plastic-coated, settable-material containing articles, and to methods of producing said articles.

More particularly, this invention relates to articles having a plastic layer that is intimately interlocked to a settable-material containing layer.

It is known in the art to apply plastic coatings to the surface of concrete articles to produce chemically resistant containers. See for example U.S. Patent 2,914,169, issued Nov. 24, 1959, to N. L. Moore, and U.S. Patent 2,716,075, issued Aug. 23, 1955, to M. A. Wiese.

It is an object of this invention to provide an improved process for the production of plastic-surfaced, settable-material containing articles. It is a further object of this invention to provide a plastic-surfaced, settable-material containing article which has a smooth plastic surface. It is a further object of this invention to provide a plastic-surfaced article in which the plastic is intimately interlocked with settable-material containing layer to produce a surface that is mechanically bound to the settable-material containing layer.

The invention may be best understood by reference to the accompanying drawings in which:

FIGURE I is a cross-section view of a concrete tank having a plastic liner.

FIGURE II is a cross-sectional view of a portion of the tank wall taken along lines 2—2 of FIGURE I.

FIGURE III is a cross-sectional view of a portion of the tank wall taken along lines 3—3 of FIGURE I.

The above objects are accomplished according to the present invention by forming a plastic layer to the configurations desired for the surface of the plastic-coated object, and then applying settable material to the opposite surface. In order to produce articles in which the settable-material containing layer is mechanically interlocked to the plastic layer, it is necessary that the surface of the plastic layer which is to contact the settable-material containing layer be rough. The rough surface may be achieved by an extrusion operation in which plastic is pushed through a suitable die, or the rough surface can be achieved by plastic welding of strips to one surface of a smooth plastic sheet, or the rough surface can be achieved by localized heat and pressure treatment to localized areas of one surface of a smooth sheet. In any event, it is necessary that the plastic sheet have projections that will interlock with the settable material at least once for every 9 square inches. The projections may be in the form of plastic loops, ribs, or other configurations. The projections may be in a regular or irregular pattern.

The number and size of interlocking projections necessary to achieve an article that will not wrinkle or sag with the changes in temperature and humidity depends upon the specific plastic material selected, and upon the particular settable material selected. Differential dimensional changes arise because of the temperature coefficients of expansion of the two materials and because of their different responses to changes in the moisture of their environment. For example, in the case of concrete, which is one of the preferred settable materials for this invention, the largest moisture change occurs from the initial wet-cured state of the concrete to a subsequent equilibrium with an ambient atmosphere which is not saturated with moisture. The initial cure of the concrete is carried out under conditions which maintain water saturation. As the concrete dries out after cure, it will shrink by amounts in the range of .05 to 1.7 inches per 100 feet. The shrinkage is not completely reversible, and subsequent changes in moisture content cause much smaller changes in length. Shrinkage of the concrete after cure is minimized by using a minimum amount of water in the mix and by using a high proportion of course aggregate.

The temperature coefficient of expansion of concrete is about $1 \times 10^{-5}$ ° C.$^{-1}$, while common thermoplastics have coefficients of thermal expansion that range from 5 to $20 \times 10^{-5}$ ° C.$^{-1}$. As a result, a change in temperature of from 0° C. to 40° C. will produce a difference in length-change between concrete and common thermoplastic of 2.4 to 9.6 inches per 100 feet.

In most instances the height of the projections on the rough surface of the plastic sheet will be between .5 and 2 inches; however, if the proportions are in the form of loops, and if metal reinforcing rods are to be passed through the loops, then longer projections, e.g., about 4 inches, are desirable.

Plastics useful to form surfaces for settable materials according to the present invention include polyethylene, polypropylene, polystyrene, copolymers of acrylonitrile, butadiene, and styrene, which are sometimes called ABS resins; polyvinyl chloride, polymethyl methacrylate, nylon, melt-fabricable tetrafluoroethylene copolymers, and blends of the above polymers. All of these polymers are thermoplastic and can be readily shaped by thermoforming. In the process of thermoforming, a sheet of plastic is heated above its softening point but below the temperature at which it loses its shape. The hot sheet is then clamped against the edges of a female mold and drawn into the mold by applying vacuum between the hot plastic and the mold. When the plastic piece is cooled enough to retain its shape, it is removed from the mold.

When very large articles are to be built, it is impractical to shape the thermoplastic layer in one piece. This impracticality may be circumvented by shaping pieces of the layer and then assembling the pieces. It is convenient to use end-to-end joints, i.e. pieces are cemented in abutting relationship to a wide back-up strip of the same thermoplastic material, or the pieces are welded together.

The settable material may be asphalt, Portland cement, calcium aluminate, and magnesia cements, lime mortar, plaster of Paris, Keens cement, and the like. Sand and aggregates can be varied as desired. Sawdust and pumice may be employed as low-density aggregates.

The settable material may be cast against the thermoplastic layer by pouring, or the settable material may be applied by plastering against the thermoplastic layer.

In the following examples which illustrate, but do not limit the invention, all parts and percentages are by weight unless otherwise specified.

*Example I*

The concrete-polyethylene storage tan shown in FIGURE I was constructed in the following manner: A polyethylene sheet ⅛ inch in thickness, was thermoformed to produce, after trimming, the dish-shaped piece 1. A 1-inch diameter hole 2 was then cut in the center. Loops 3 were formed on the external surface of the dish-shaped piece by welding ⅛-inch diameter polyethylene beading to this surface. The loops were formed by bending the beading so that points 1½ inches apart on the bead were welded to points 1 inch apart on the external surface of the dish-shaped article, see FIGURE II. Continuous lines of beading loops were welded in concentric rings about 1 inch apart over the entire external surface.

A drain line 4 of polyethylene tubing having a 1-inch internal diameter was constructed by molding a flange 5 to one end and welding a spiral bead 6 to the outer surface. A 1-inch dowel was inserted in the tubing to support it while the bead was being applied. The tubing was then welded to the circumference of hole 2.

The tank wall 7 was produced by welding polyethylene sheet directly to the dish-shaped section. This sheet had been passed through hot calender rolls immediately after extrusion in such a manner that one side remained flat, but the other had slightly tapering ridges approximately ⅛ inch thick, ¾ inch high and 1 inch apart. This sheeting was welded so that the length of ridges ran parallel to the length of the tank. The seam where the sheeting joined to form the closed tube was also welded.

A top flange 8 was welded to the other end of the polyethylene sheeting. This flange was made by thermoforming polyethylene sheeting, and welding the pieces together.

The polyethylene liner was now suspended on a support by means of flange 8, and a form for pouring concrete was placed around the base of the liner. A wooden dowel was placed part way into the bottom drain tube 4. The tubing was bent near the base of the liner and the bent portion packed with wet sand. A 4-inch clearance was allowed between the flange and the side of the base. Reinforcing rod 9 was spaced throughout the base portion, and several of the rods were inserted through the polyethylene loops in the external surface of the dish-shaped portion 1.

The concrete used was prepared with careful attention to the proportions of ingredients used so as to minimize the shrinkage caused by loss of moisture after cure. For each bag of Portland cement, 2¼ cubic feet of sand and 4½ cubic feet of gravel were used. The gravel contained mixed sizes up to about one inch in diameter. Water was added to give a fairly stiff mix. This required about 3½ gallons per batch.

The base was poured to the point where the top surface of the mix just reached the joint between the drain pipe and the bottom of the tank. This was kept moist and allowed to harden over a week-end.

A reinforcing grade of wire netting 10, was now placed around and very close to the liner. This was wired to the liner by means of holes 11, punched in the vertical ribs 12. A ring of forms was now put in place on top of the base forms. These forms were made of 16 gauge iron sheet, flanged to allow bolting together of segments, and reinforced with strips welded to the outside surface between the flanges. With the first ring of forms in place, a second layer of wire net reinforcement 13 just high enough to reach the top of the form was wired in place so as to be very close to the outside surface of the finished structure.

Addition was made simultaneously of the concrete mix to the space between liner and forms and of sand and water to the inside of the tank. It was necessary to keep the level inside and outside carefully balanced so as not to distort the liner. When the level of the mix came close to the flange it was necessary to work carefully by hand to pack the space under the flange before a final two-inch form segment was put in place. The outside layer of reinforcement did not extend up into this top portion, or cap.

When the concrete had cured and the forms were removed, there resulted a durable and serviceable tank for handling a variety of corrosive liquids.

*Example II*

A simulated wall panel was made using a 24-inch by 36-inch section of extruded polyethylene sheeting as the facing material. This sheeting had been specially extruded so that one side had parallel ridges ⅛ inch thick, ¾ inch high and 1 inch apart from center to center.

A piece of expanded metal lath of the same size (24″ x 36″) was heated in an oven to 200° C. It was removed from the oven, laid immediately on the ridged side of the polyethylene sheet and pressed firmly so that it penetrated deeply into the ridges and lay closely against the surface of the plastic sheet.

When this assembly had cooled, it was supported in a vertical position to simulate a section of wall. A moderately stiff mortar was prepared from sand and portland cement. This was applied to the side with the lath using a plasterer's trowel and pressing the material firmly so as to make good contact with the plastic through the lath. A second section of lath was strapped on top while the mortar was still soft. After the mortar had hardened overnight, a second coat was applied to cover the second layer of metal lath. When the mortar had cured, this combination represented quite adequately a section of self-supporting wall with a smooth and attractive surface.

*Example III*

Corrosion-resistant and solvent-resistant pipe was made as follows. A piece of 1-inch diameter tubing made of polytetrafluoroethylene resin was flanged at both ends by spinning in a lathe using a forming tool to open the tube into a flange. This piece of flanged tubing was then mounted on an oak mandrel, over which it would just slide. Loops of polyethylene were cemented to the surface.

Blown asbestos was mixed with 40% of ground limestone in a steam heated mixer. This mixture was applied with trowel and brush to the outside of the flanged tube as the supporting mandrel was slowly rotated. This was continued until a layer ¾ inch thick had been built up of the filled asphalt. This covered both the tube and the outside of the flanges. When the asphalt had thoroughly cooled, the pipe was removed from the mandrel and bolt holes were drilled in the flanges. A pipe resulted which can be used to carry organic solvents, highly corrosive acids and bases, strong oxidizing solutions, or aqueous salt solutions. Such pipe has an indefinite service life at low pressure and moderate temperature. The pressure ratings were increased in similarly prepared pipe by the use of circumferential windings of wire, glass roving, and/or organic fillers within the asphalt layer.

I claim:

A process for the preparation of a polyethylene-surfaced, steel-reinforced, concrete tank comprising:
  (a) forming a polyethylene liner by,
    (1) thermoforming a first polyethylene sheet to produce a circular dish-shaped piece having a concave side and a convex side, attaching a series of loops in concentric circles on said convex side with polyethylene beading, said concentric circles being spaced approximately one inch apart,
    (2) forming a second polyethylene sheet, said second polyethylene sheet having a ridged side and a flat side,
    (3) welding the edge of said second sheet with said ridged side on the exterior around the edge of said dish-shaped piece and welding the seam thus formed by the edges of said second sheet, whereby said convex side and said ridged side form the exterior surface of said liner;

(b) reinforcing said liner by passing steel rods through some of said loops and by attaching wire netting to said ridged side; and (c) applying a settable material to the exterior surface of said liner.

References Cited

UNITED STATES PATENTS

| | | | |
|---|---|---|---|
| 981,440 | 6/1908 | Rader | 161—53 |
| 1,747,964 | 2/1930 | Wirth | 156—304 |
| 1,899,067 | 2/1933 | Trumbull | 156—304 |
| 2,083,491 | 6/1937 | Chaffee | 52—269 |
| 2,331,140 | 10/1943 | Schmidt | 52—378 |
| 2,399,744 | 5/1946 | Kaphan | 52—309 |
| 2,558,580 | 6/1951 | Pomykala | 52—224 |
| 2,816,323 | 12/1957 | Munger | 52—309 |
| 2,839,441 | 6/1958 | Kent | 156—309 |
| 2,948,651 | 8/1960 | Waag | 161—53 |
| 3,043,730 | 7/1962 | Adie | 52—309 |
| 3,123,025 | 3/1964 | Fugelstad | 52—269 |
| 3,152,548 | 10/1964 | Schwartz | 52—378 |

FOREIGN PATENTS

| | | |
|---|---|---|
| 222,719 | 6/1959 | Australia. |
| 117,667 | 7/1918 | Great Britain. |

FRANK L. ABBOTT, *Primary Examiner.*

J. L. RIDGILL, *Assistant Examiner.*